(12) United States Patent
Wang et al.

(10) Patent No.: US 9,638,793 B2
(45) Date of Patent: May 2, 2017

(54) VIRTUAL ANTENNA EXTENSION FOR SAMPLED APERTURE ARRAYS

(71) Applicant: RAYTHEON CANADA LIMITED, Ottawa (CA)

(72) Inventors: Jian Wang, Waterloo (CA); Anthony M. Ponsford, Ottawa (CA); Emily Wang, Waterloo (CA); Rick McKerracher, Waterloo (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 258 days.

(21) Appl. No.: 13/742,220

(22) Filed: Jan. 15, 2013

(65) Prior Publication Data

US 2014/0197984 A1    Jul. 17, 2014

(51) Int. Cl.
*G01S 13/76* (2006.01)
*G01S 13/28* (2006.01)
*G01S 13/524* (2006.01)
*G01S 13/02* (2006.01)

(52) U.S. Cl.
CPC .......... *G01S 13/288* (2013.01); *G01S 13/5246* (2013.01); *G01S 2013/0227* (2013.01); *G01S 2013/0254* (2013.01)

(58) Field of Classification Search
CPC ........ G01S 13/87; G01S 13/24; G01S 13/003; G01S 13/288
USPC .............................. 342/88–89, 200–202, 464
See application file for complete search history.

(56) References Cited

U.S. PATENT DOCUMENTS

| | | | | |
|---|---|---|---|---|
| 4,996,534 A | * | 2/1991 | Grubbs | G01S 7/412 342/195 |
| 5,057,845 A | * | 10/1991 | Gellekink | G01S 13/227 342/137 |
| 6,639,546 B1 | * | 10/2003 | Ott | G01S 13/20 342/129 |
| 6,717,545 B2 | | 4/2004 | Dizaji et al. | |
| 6,795,491 B2 | * | 9/2004 | Fleming | G01S 5/0072 342/125 |
| 6,867,731 B2 | | 3/2005 | Dizaji et al. | |

(Continued)

OTHER PUBLICATIONS

U.S. Appl. No. 13/723,940, filed Dec. 21, 2012.

(Continued)

*Primary Examiner* — Marcus Windrich
(74) *Attorney, Agent, or Firm* — Lewis Roca Rothgerber Christie LLP (57) ABSTRACT

A high frequency surface wave radar (HFSWR) system with improved performance. Two or more transmitters including separate transmitting antennas (120, 122, 410) are used to improve the performance of the HFSWR over the performance of a comparable system with a single transmitter. In one embodiment, two transmitters are used, and configured to transmit pulses alternately, with a time interval of at least a round-trip travel time corresponding to a maximum target range between any pair of transmitted pulses. A physical receiving antenna array (130) includes a plurality of receiving antenna elements (135), and is connected to receiver circuitry configured to distinguish returns corresponding to pulses emitted by the different transmitters. The returns are concatenated in the receiver circuitry to achieve improved resolution.

20 Claims, 6 Drawing Sheets

(56) References Cited

U.S. PATENT DOCUMENTS

| | | | |
|---|---|---|---|
| 6,977,610 B2* | 12/2005 | Brookner | G01S 13/87 342/126 |
| 7,151,483 B2 | 12/2006 | Dizaji et al. | |
| 7,626,535 B2 | 12/2009 | Ding et al. | |
| 7,773,028 B2* | 8/2010 | Chan | G01S 7/282 342/118 |
| 8,884,811 B2* | 11/2014 | Zwick | G01S 13/325 342/159 |
| 2005/0242985 A1* | 11/2005 | Ponsford | G01S 7/36 342/59 |
| 2006/0238406 A1* | 10/2006 | Nohara | G01S 7/003 342/90 |
| 2009/0009385 A1* | 1/2009 | Lehtinen | G01S 13/56 342/196 |
| 2009/0237292 A1* | 9/2009 | Tigrek | G01S 13/28 342/109 |
| 2010/0328157 A1* | 12/2010 | Culkin | H01Q 21/061 342/372 |
| 2011/0109498 A1 | 5/2011 | Goutelard | |
| 2011/0241929 A1 | 10/2011 | Emery | |
| 2012/0112957 A1* | 5/2012 | Nguyen | G01S 13/9035 342/25 A |
| 2013/0201054 A1 | 8/2013 | Wang et al. | |

OTHER PUBLICATIONS

Chen et al., "MIMO Radar Space-Time Adaptive Processing Using Prolate Spheroidal Wave Function", IEEE Transactions on Signal Processing, 56(2): 623-635, 2008.

Jin et al., "Virtual Array Imaging Radar Azimuth Resolution Analysis", College of Electronic Science and Engineering, National University of Defense Technology, Changsha 410073, China. (4 sheets).

Ma et al., :Mono-static MIMO radar array design for interferences suppressing, IEEE, 2009, 2683-2686.

Wang et al., "High-Resolution Imaging Using a Wideband MIMO Radar System with Two Distributed Arrays", IEEE Transactions on Image Processing, 19(5): 1280-1289, 2010.

Wang et al., "Music-Enhanced CFAR for High Frequency Over-the-Horizon Radar", IEEE, 379-384, 2007.

\* cited by examiner

VIRTUAL ANTENNA EXTENSION FOR SAMPLED APERTURE ARRAYS

CROSS-REFERENCE TO RELATED APPLICATIONS

This application is related to and incorporates by reference in its entirety, as if set forth in full, U.S. Pat. No. 7,151,483, entitled "SYSTEM AND METHOD FOR CONCURRENT OPERATION OF MULTIPLE RADAR OR ACTIVE SONAR SYSTEMS ON A COMMON FREQUENCY" and U.S. Pat. No. 7,773,028, entitled "METHOD AND SYSTEM FOR CONCATENATION OF RADAR PULSES."

BACKGROUND

1. Field

One or more aspects of embodiments according to the present invention relate to high frequency surface wave radar, and particularly to a system and method for achieving improved performance in a high frequency surface wave radar system.

2. Description of Related Art

High frequency surface wave radar (HFSWR) has been employed for more than three decades for detecting and tracking maritime targets beyond the horizon, and particularly to the boundaries of the economic exclusion zone (EEZ), for civilian and military purposes. In HFSWR installations, it is desirable to reduce the physical size of the receiving array of the radar. From an implementation point of view this can significantly reduce the physical extent of the radar site and thereby increase the number of location options. Simply employing a smaller receiving array, however, may compromise the overall performance, and, in particular, the resolution of the radar.

Thus, there is a need for an HFSWR system with reduced size which maintains good resolution.

SUMMARY

An aspect of an embodiment of the present invention is directed towards employing two or more transmitters, together with a receiving antenna array, to form an HFSWR having a virtual receiving array which is larger than the physical receiving antenna array, i.e., an HFSWR showing the performance of an HFSWR with a larger array.

According to an embodiment of the present invention there is provided a high frequency surface wave radar system, including: a physical receiving antenna array including a plurality of receiving antenna elements; receiver circuitry coupled to the receiving antenna elements; a first transmitter, configured to transmit a first sequence of radar pulses separated from each other by at least a round-trip travel time corresponding to a maximum target range; and a second transmitter, configured to transmit a second sequence of radar pulses separated from each other by at least the round-trip travel time corresponding to the maximum target range; wherein the receiver circuitry is configured to: distinguish first radar returns, corresponding to radar pulses in the first sequence of radar pulses, from second radar returns, corresponding to radar pulses in the second sequence of radar pulses; and concatenate the first radar returns and the second radar returns to form a virtual receiving antenna array having a width greater than the width of the physical receiving antenna array.

In one embodiment, the first transmitter is configured to generate a first sequence of radar pulses separated from each other by at least twice the round-trip travel time corresponding to the maximum target range; the second transmitter is configured to generate a second sequence of radar pulses separated from each other by at least twice the round-trip travel time corresponding to the maximum target range, each pulse in the second sequence of radar pulses being separated from each pulse in the first sequence of radar pulses by at least the round-trip travel time corresponding to the maximum target range.

In one embodiment, the receiver circuitry is configured to distinguish first radar returns, corresponding to radar pulses in the first sequence of radar pulses, from second radar returns, corresponding to radar pulses in the second sequence of radar pulses, by: identifying a radar return received after the transmission of a pulse in the first sequence of pulses and before the following pulse in the second sequence of pulses as a first radar return; and identifying a radar return received after the transmission of a pulse in the second sequence of pulses and before the following pulse in the first sequence of pulses as a second radar return.

In one embodiment, the first transmitter and the second transmitter are configured to transmit pulses simultaneously.

In one embodiment, pulses in the first sequence of pulses have a first carrier frequency; pulses in the second sequence of radar pulses have a second carrier frequency; and the second carrier frequency differs from the first carrier frequency.

In one embodiment, the second carrier frequency differs from the first carrier frequency by more than 0.00001 percent of the first carrier frequency.

In one embodiment, the receiver circuitry includes a matched filter to distinguish the first radar returns from the second radar returns.

In one embodiment, the first transmitter and the second transmitter are configured to transmit pulses including phase coding.

In one embodiment, the receiver circuitry is configured to distinguish first radar returns, corresponding to radar pulses in the first sequence of radar pulses, from second radar returns, corresponding to radar pulses in the second sequence of radar pulses, by their phase coding.

In one embodiment, the system includes one or more additional transmitters, each of the additional transmitters configured to transmit a sequence of radar pulses separated from each other by at least the round-trip travel time corresponding to the maximum target range.

In one embodiment, the receiver circuitry is further configured to: distinguish the first radar returns, the second radar returns, and the radar returns corresponding to pulses transmitted by each of the additional transmitters from each other; and concatenate the first radar returns, the second radar returns and the radar returns corresponding to pulses transmitted by each of the additional transmitters, to form a virtual receiving antenna array having a width greater than the width of the physical receiving antenna array.

In one embodiment, the receiving antenna elements are uniformly spaced.

In one embodiment, the physical receiving antenna array includes 8 receiving antenna elements.

In one embodiment, the first transmitter includes a first transmitter drive circuit and a first transmitting antenna and the second transmitter includes the first transmitter drive circuit and a second transmitting antenna.

In one embodiment, the system includes a first transmitter drive circuit, a first transmitting antenna, a second transmitting antenna, and a switch, wherein in a first position the switch connects the first transmitter drive circuit to the first transmitting antenna, and in a second position the switch connects the first transmitter drive circuit to the second transmitting antenna.

According to an embodiment of the present invention there is provided a method for operating a high frequency surface wave radar system, including: transmitting, from a first transmitting location, a first sequence of first radar pulses, separated from each other by at least a round-trip travel time corresponding to a maximum target range; transmitting, from a second transmitting location, a second sequence of second radar pulses separated from each other by at least the round-trip travel time corresponding to the maximum target range; receiving, with a physical receiving antenna array including a plurality of receiving antenna elements, a sequence of returns including: first radar returns, corresponding to radar pulses in the first sequence of radar pulses, and second radar returns, corresponding to radar pulses in the second sequence of radar pulses; distinguishing the first radar returns from the second radar returns; and concatenating the first radar returns and the second radar returns.

In one embodiment, the transmitting, from the first transmitting location, of the first sequence of radar pulses, includes transmitting a sequence of first radar pulses separated from each other by at least twice the round-trip travel time corresponding to the maximum target range; and the transmitting, from the second transmitting location, of the second sequence of radar pulses, includes transmitting a sequence of second radar pulses separated from each other by at least twice the round-trip travel time corresponding to the maximum target range, each pulse in the second sequence of radar pulses being separated from each pulse in the first sequence of radar pulses by at least the round-trip travel time corresponding to the maximum target range.

In one embodiment, the transmitting, from the second transmitting location, of the second sequence of second radar pulses includes transmitting second radar pulses simultaneously with the transmitting of first radar pulses.

In one embodiment, the wherein the transmitting, from the second transmitting location, of the second sequence of second radar pulses includes transmitting second radar pulses at a frequency different from a frequency of the first radar pulses.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a virtual antenna extension for sampled aperture arrays provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
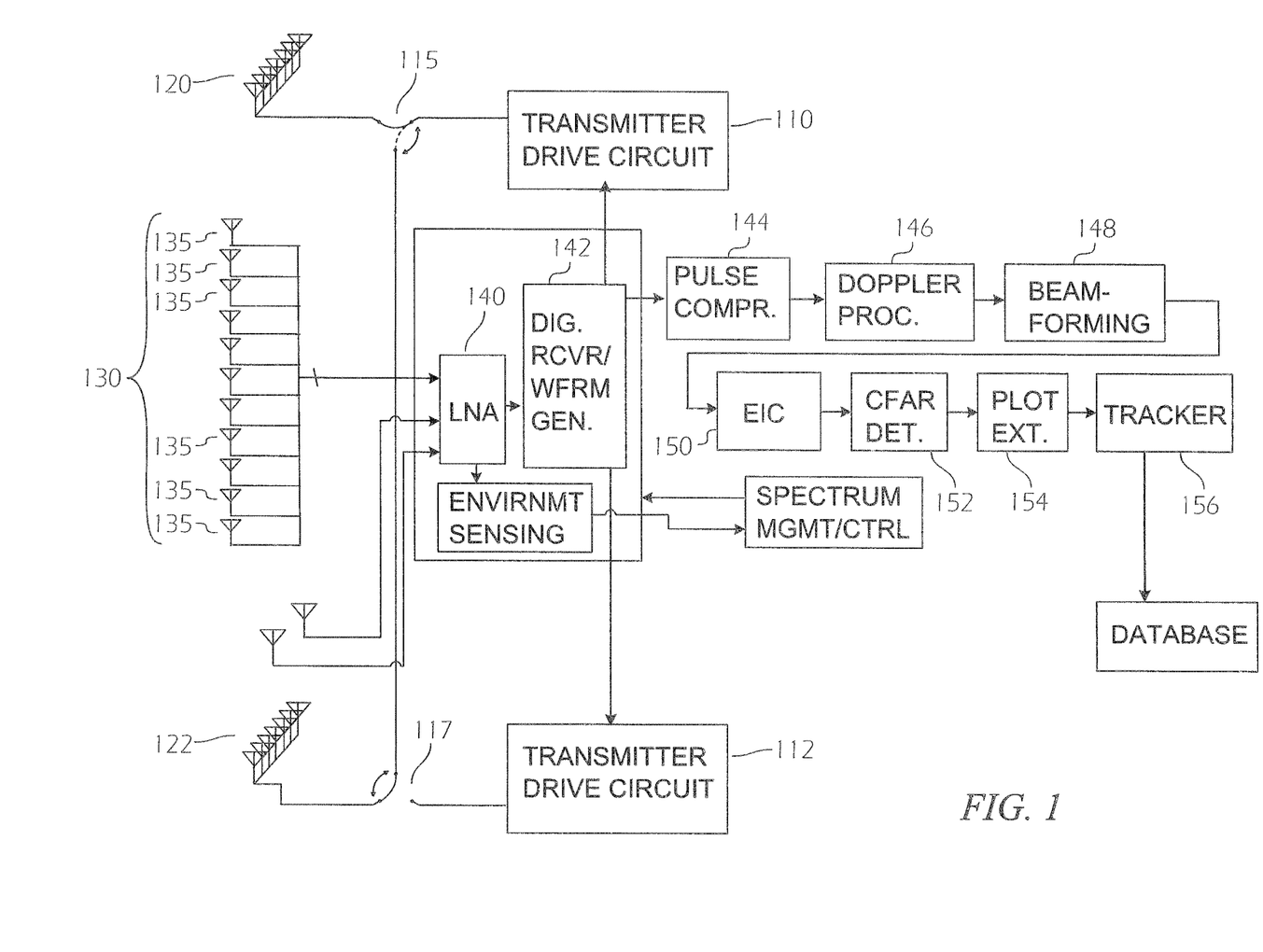
FIG. 1 is a schematic block diagram of a high frequency surface wave radar system according to an embodiment of the present invention.

Referring to FIG. 1, in one embodiment, a high frequency surface wave radar (HFSWR) system includes the principal functional elements shown. A first transmitter drive circuit 110 provides a drive signal, through a first switch 115, to a first transmitting antenna 120, which emits a first sequence of radar pulses. A second transmitting antenna 122 may emit a second sequence of radar pulses. The first transmitting antenna 120 may be a single monolithic antenna, or it may be an antenna array, composed of transmitting antenna elements. The pulses propagate to one or more targets, from which they reflect, becoming radar returns propagating back to the receiving antenna array 130.

The signals from the receiving antenna elements 135 in the receiving antenna array are individually amplified by a block of low-noise amplifiers (LNA) 140, and, in a digital receiver/waveform generator ("DIG. RCVR/WFRM GEN.") block 142, they are filtered, and converted to digital form in a process referred to as direct conversion, in which the analog output signal is sampled at the radar frequency. The digital data stream is then processed by a series of digital processing blocks. A pulse compression ("PULSE COMPR.") block 144 allows the radar to use a long pulse to maximize the radiated energy for long range detection, while still maintaining the range resolution equivalent to a shorter pulse. Each channel of time-accumulated, range gated data is processed using a Doppler processing ("DOPPLER PROC.") block 146 to convert to the Doppler frequency domain. The signal to noise ratio is improved through this integration process. A beam-forming algorithm is applied, in the beam-forming block 148, to the calibrated, channel domain, range-Doppler data to yield the azimuth-based beam range-Doppler data. This is used to electronically steer the beam over the coverage. External interference cancellation (EIC) is applied, in the EIC block 150, to remove external interference from the data.

Constant false alarm rate detectors ("CFAR DET.") are integrated, in a CFAR block 152, into the processing chain to isolate detections from the background clutter for a given beam. Different types of CFAR can be selected for different applications, so that, for example, for ship mode processing, an Ordered Statistic Constant False Alarm Rate (OS-CFAR)

detector may be used, and for air mode processing, a Cell Averaging Constant False Alarm Rate (CA-CFAR) detector may be used. Other types of CFAR detectors which may be used include Adaptive Switching Constant False Alarm Rate (AS-CFAR) and Knowledge-Aided AS-CFAR. A detection threshold may be set up, in the form of a threshold curve, and this curve may vary with range. Target CFAR hits are forwarded to the plot extractor 154 ("PLOT EXT."), which centroids the target position in range, bearing and Doppler. The response from a target generally will be distributed over range, Doppler and azimuth, resulting in multiple CFAR detections per target. The plot extractor 154 centroids groups of CFAR detections to form a plot, which corresponds to one single point along three axes of range, Doppler and azimuth in engineering units. Finally, a tracker 156 is employed to receive data from the plot extractor to form tracks. Such a system may be capable of simultaneously tracking both fast and slow targets. In the tracker processing, deferred decision track promotion logic may be employed to reduce the likelihood of lost, switched or missed tracks by allowing various possible scenarios at each update (such as extension of existing target tracks, false alarms and new tracks), and by not discarding alternative outcomes until they become highly unlikely. Such processing provides an optimum solution to the tracking problem; it may be efficiently implemented through the use of multi-dimensional data clustering. The combination of amplifying, filtering, and data processing elements used to process the signals received by the receiving antenna array elements may collectively be referred to as the receiver circuitry. As used herein the terms "circuit" and "circuitry" include electronic hardware and firmware, and any software that may be stored in, and executed by, such electronic hardware and firmware.

In one embodiment, the first transmitter drive circuit 110 may drive the first transmitting antenna 120 and a second transmitting antenna 122 alternately, if the first switch 115 is configured to connect the first transmitter drive circuit 110 alternately to the first transmitting antenna 120 and (as indicated by the dashed line in FIG. 1 at the first switch 115) to a second transmitting antenna 122. In another embodiment, the first switch may be configured to connect the first transmitter drive circuit 110 to the first transmitting antenna 120, and a second switch 117 may be configured to connect a second transmitter drive circuit 112 to the second transmitting antenna 122. In another embodiment both switches 115, 117 may be absent and each transmitter drive circuit 110, 112 may be wired directly to the corresponding transmitting antenna 120, 122.

Figure 2A:
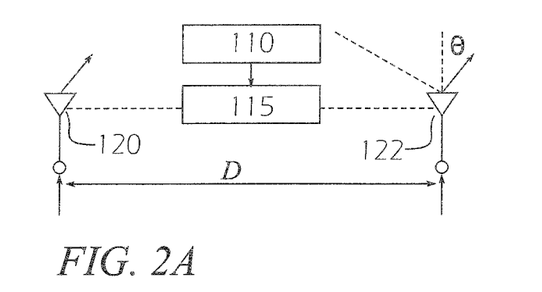
FIG. 2A is a schematic diagram of two separately situated transmitting antennas with shared transmitter drive circuitry according to an embodiment of the present invention.
Figure 2B:
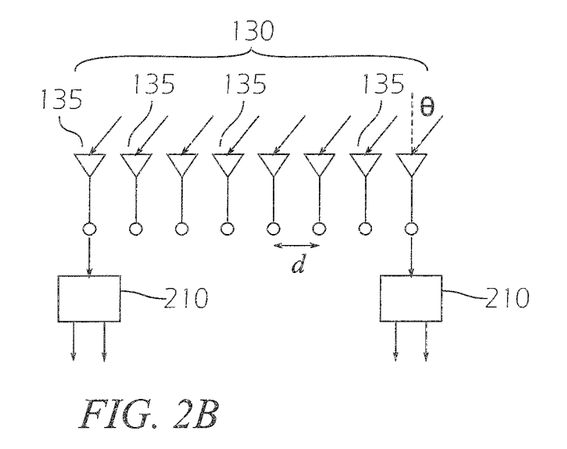
FIG. 2B is a schematic diagram of a physical receiving antenna array according to an embodiment of the present invention.

Referring to FIG. 2A, two transmitting antennas 120,122 may be installed, separated by a distance D, driven alternately by a transmitter drive circuit 110, so that the first transmitting antenna and the second transmitting antenna transmit alternate pulses. Referring to FIG. 2B, an array of m receiving antenna elements 135, forming a physical receiving antenna array 130, may be installed and configured to receive radar returns corresponding to the transmitted radar pulses. In one embodiment, in which the transmitting antennas 120,122 are not driven alternately as shown in FIG. 2A but are driven simultaneously, by a first transmitter drive circuit 110 and a second transmitter drive circuit 112 respectively, a matched filter 210 may be employed in the signal path at each receiving antenna element 135, e.g., at the output of each corresponding LNA (not shown in FIG. 2B), to separate returns corresponding to the first sequence of radar pulses from returns corresponding to the second sequence of radar pulses. For clarity only two matched filters 210 are shown in FIG. 2B, but in one embodiment a matched filter is used for each receiving antenna element 135, each matched filter 210 having as many outputs as there are transmitters in the system, and each output providing return signals corresponding to one of the transmitters.

Figure 2C:
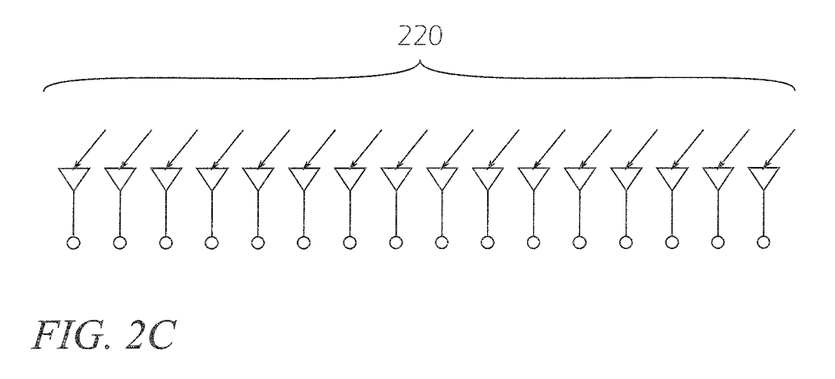
FIG. 2C is a schematic diagram of a virtual receiving antenna array according to an embodiment of the present invention.

Referring to FIG. 2C, in one embodiment, when two transmitting antennas are used, separated by a distance D=md, suitable processing, e.g., concatenation, of the received signals results in an output equivalent to the output that would be produced with a single transmitter and a receiving antenna array having 2m receiving antenna elements. For this reason, the arrangement of this embodiment may be said to form a virtual receiving antenna array 220 having a greater width than the physical receiving antenna array, or, equivalently, the system may be said to result in a virtual antenna extension.

Although as illustrated in FIG. 2A, in one embodiment the transmitting antennas may share a transmitter drive circuit, the present invention is not limited thereby. Two or more transmitters may be constructed to be separate subsystems, each with its own transmitter drive circuit, or, as illustrated for example in FIG. 2A, two transmitters may share common elements, such as a transmitter drive circuit. Thus, as used herein the term transmitter refers to any system, having a separate transmitting antenna, for transmitting a radar pulse; a transmitter may be a separate system, or it may share components with other transmitters, so that, for example, the transmitter drive circuit used in a first transmitter may also be a component of a second transmitter.

Figure 3A:
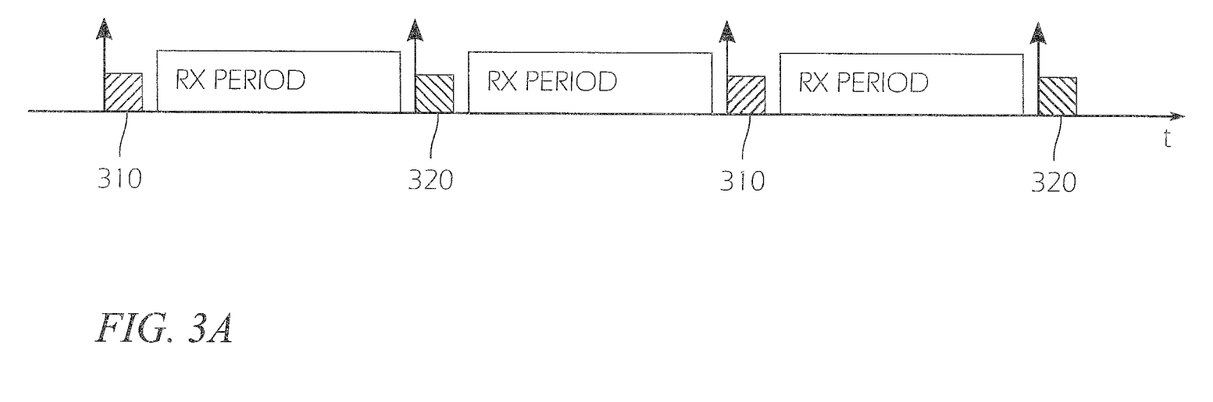
FIG. 3A is a timeline of pulse transmission and reception according to an embodiment of the present invention.

Referring to FIG. 3A, the sequence of transmitted pulses and receiving periods may be illustrated on a timeline as shown. Pulses 310 from a first transmitter may alternate with pulses 320 from a second transmitter, and a receiving period ("RX PERIOD" in FIG. 3A), during which the transmitters are silent, may follow each pulse 310, 320. In one embodiment, consecutive pulses are separated by, and the receiving period lasts, at least one round-trip travel time for the radar signal, i.e., the time required for the signal to travel to a target at maximum target range and back to the receiver. In this embodiment, returns corresponding to pulses transmitted by the first transmitter and the second transmitter may be distinguished by timing, e.g., any return received in a receiving period immediately following the transmission of a pulse may be assumed to be a return corresponding to this pulse.

In an embodiment with a receiving antenna array having m receiving antenna elements, separated by a distance d, and two transmitters separated by a distance D=md, and transmitting pulses at the same frequency, it can be shown as follows that the behavior of the system is that of a system with a single transmitter and a receiving antenna array having twice the number of receiving antenna elements. For example, a physical receiving antenna array with 8 receiving antenna elements may be operated with two transmitters to form a 16-element virtual receiving antenna array, i.e., to achieve the performance that, with a single transmitter, would be achieved with a 16-element physical receiving antenna array. Under the convention used in the following, bold lower-case letters denote vectors, and bold upper-case letters denote matrices, and the superscript T denotes a matrix transpose. For a receiving antenna array having m uniformly-spaced receiving antenna elements, the traditional narrow-band array model for far field planar incident waves is $$y(t)=As(t)+n(t)$$

where n(t) is an additive spatially white noise vector; s(t) contains temporal signals reflected by the k independent scattering sources, e.g., targets, and s(t) is uncorrelated with n(t). Matrix A, $$A = [a(\theta_1), a(\theta_2), \ldots, a(\theta_k)],$$

contains the phase factors for the receiving antenna elements and targets; the $i^{th}$ column of A is $$a(\theta_i) = \left[1, e^{-j2\pi \frac{d\sin(\theta_i)}{\lambda}}, \ldots, e^{-j2\pi \frac{d\sin(\theta_i)}{\lambda}(m-1)}\right]^T$$

where m is the number of receiving antenna elements; $\theta_i$ is the direction of arrival of the return signal from the $i^{th}$ source, and $\lambda$ and d are the radar carrier wavelength and receiving antenna element spacing, respectively.

The first pulse return at time t is:

$$y_1(t) = A_1 s(t) + n(t)$$

$$= \begin{bmatrix} 1 & 1 & \ldots & 1 \\ e^{-j2\pi \frac{d\sin(\theta_1)}{\lambda}} & e^{-j2\pi \frac{d\sin(\theta_2)}{\lambda}} & \ldots & e^{-j2\pi \frac{d\sin(\theta_k)}{\lambda}} \\ \vdots & \vdots & \vdots & \vdots \\ e^{-j2\pi \frac{d\sin(\theta_1)}{\lambda}(m/2-1)} & e^{-j2\pi \frac{d\sin(\theta_2)}{\lambda}(m/2-1)} & \ldots & e^{-j2\pi \frac{d\sin(\theta_2)}{\lambda}(m/2-1)} \end{bmatrix} s(t) + n_1(t).$$

The pulse return following the first one (and at the same carrier frequency) is:

$$y_2(t+\tau) = A_2 s(t+\tau) + n(t+\tau)$$

$$= \begin{bmatrix} e^{-j2\pi \frac{d\sin(\theta_1)}{\lambda}\frac{m}{2}} & e^{-j2\pi \frac{d\sin(\theta_2)}{\lambda}\frac{m}{2}} & \ldots & e^{-j2\pi \frac{d\sin(\theta_k)}{\lambda}\frac{m}{2}} \\ e^{-j2\pi \frac{d\sin(\theta_1)}{\lambda}(\frac{m}{2}+1)} & e^{-j2\pi \frac{d\sin(\theta_2)}{\lambda}(\frac{m}{2}+1)} & \ldots & e^{-j2\pi \frac{d\sin(\theta_k)}{\lambda}(\frac{m}{2}+1)} \\ \vdots & \vdots & \vdots & \vdots \\ e^{-j2\pi \frac{d\sin(\theta_1)}{\lambda}(m-1)} & e^{-j2\pi \frac{d\sin(\theta_2)}{\lambda}(m-1)} & \ldots & e^{-j2\pi \frac{d\sin(\theta_k)}{\lambda}(m-1)} \end{bmatrix} s(t+\tau) + n_2(t+\tau)$$

where $\tau$ is the separation between consecutive pulses, i.e., the pulse repetition interval (PRI). In HFSWR, the signals are narrow-band, and therefore:

$$s(t) \approx s(t+\tau)$$

Concatenating, i.e., combining, the returns produces:

$$\begin{bmatrix} y_1(t) \\ y_2(t+\tau) \end{bmatrix} = \begin{bmatrix} 1 & 1 & \ldots & 1 \\ e^{-j2\pi \frac{d\sin(\theta_1)}{\lambda}} & e^{-j2\pi \frac{d\sin(\theta_2)}{\lambda}} & \ldots & e^{-j2\pi \frac{d\sin(\theta_k)}{\lambda}} \\ \vdots & \vdots & \vdots & \vdots \\ e^{-j2\pi \frac{d\sin(\theta_1)}{\lambda}(m/2-1)} & e^{-j2\pi \frac{d\sin(\theta_2)}{\lambda}(m/2-1)} & \ldots & e^{-j2\pi \frac{d\sin(\theta_k)}{\lambda}(m/2-1)} \\ e^{-j2\pi \frac{d\sin(\theta_1)}{\lambda}\frac{m}{2}} & e^{-j2\pi \frac{d\sin(\theta_2)}{\lambda}\frac{m}{2}} & \ldots & e^{-j2\pi \frac{d\sin(\theta_k)}{\lambda}\frac{m}{2}} \\ e^{-j2\pi \frac{d\sin(\theta_1)}{\lambda}(\frac{m}{2}+1)} & e^{-j2\pi \frac{d\sin(\theta_2)}{\lambda}(\frac{m}{2}+1)} & \ldots & e^{-j2\pi \frac{d\sin(\theta_k)}{\lambda}(\frac{m}{2}+1)} \\ \vdots & \vdots & \vdots & \vdots \\ e^{-j2\pi \frac{d\sin(\theta_1)}{\lambda}(m-1)} & e^{-j2\pi \frac{d\sin(\theta_2)}{\lambda}(m-1)} & \ldots & e^{-j2\pi \frac{d\sin(\theta_k)}{\lambda}(m-1)} \end{bmatrix} s(t) + \begin{bmatrix} n_1(t) \\ n_2(t) \end{bmatrix}$$

$$= As(t) + n(t),$$

which can be seen, by inspection, to be the same return as one would obtain from a receiving antenna array having 2m elements, in a system with only one transmitter. This hypothetical, equivalent, receiving antenna array having 2m elements may be referred to as the virtual receiving antenna array. Each of the quantities $y_1(t)$, $y_2(t+\tau)$ and $$\begin{bmatrix} y_1(t) \\ y_2(t+\tau) \end{bmatrix}$$

may be formed as a numerical array in a digital processing block, each numerical array consisting of a plurality of time series (e.g., m or 2m time series), each time series consisting of samples of a radar return received by an antenna element.

Figure 4:
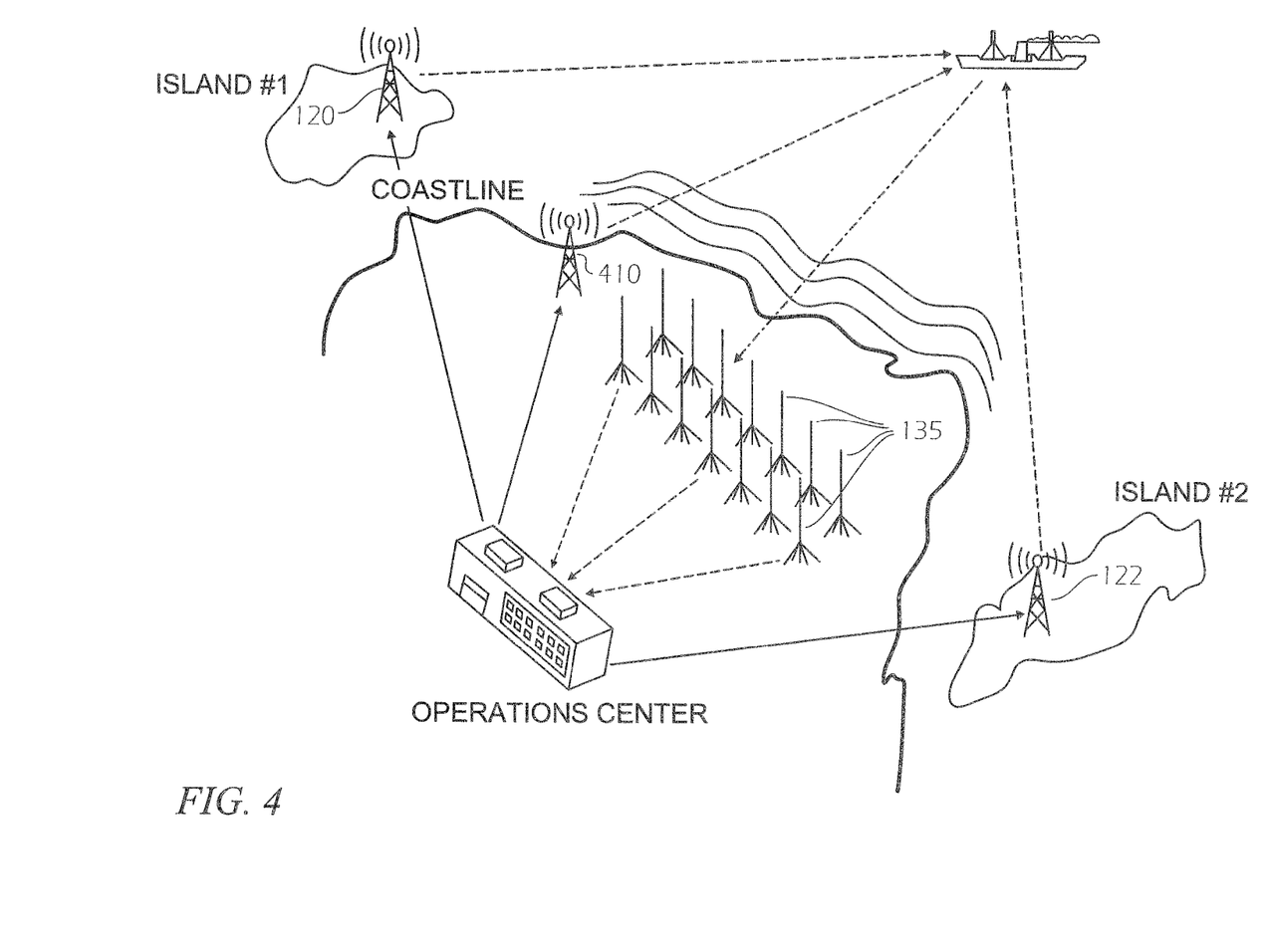
FIG. 4 is a perspective view of a high frequency surface wave radar according to an embodiment of the present invention.

Referring to FIG. 4, in another embodiment, a third transmitting antenna 410, or more than three transmitting antennas, may be used, further extending the width of, and the number of elements in, the virtual receiving antenna array. When building an HFSWR installation, the coastline may for example present constraints on the size of a physical receiving antenna array, and using additional transmitters to form a large virtual receiving antenna array may be a cost effective way to build an installation with the required resolution. The separation between transmitters need not be the width of the receiving antenna array, although, as will be apparent to one of skill in the art, the performance of the system may depend on the relative locations of the transmitters, and on the separation between them. Electronic equipment used in the installation may be housed in an operations center.

Figure 3B:
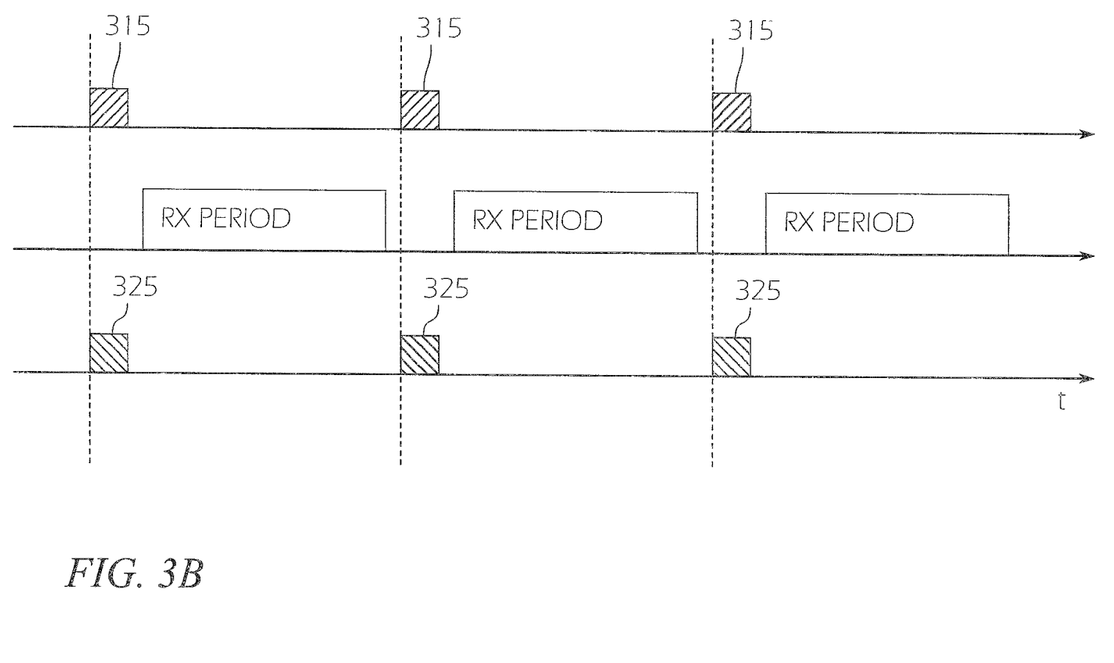
FIG. 3B is a timeline of pulse transmission and reception according to another embodiment of the present invention.
Figure 3C:
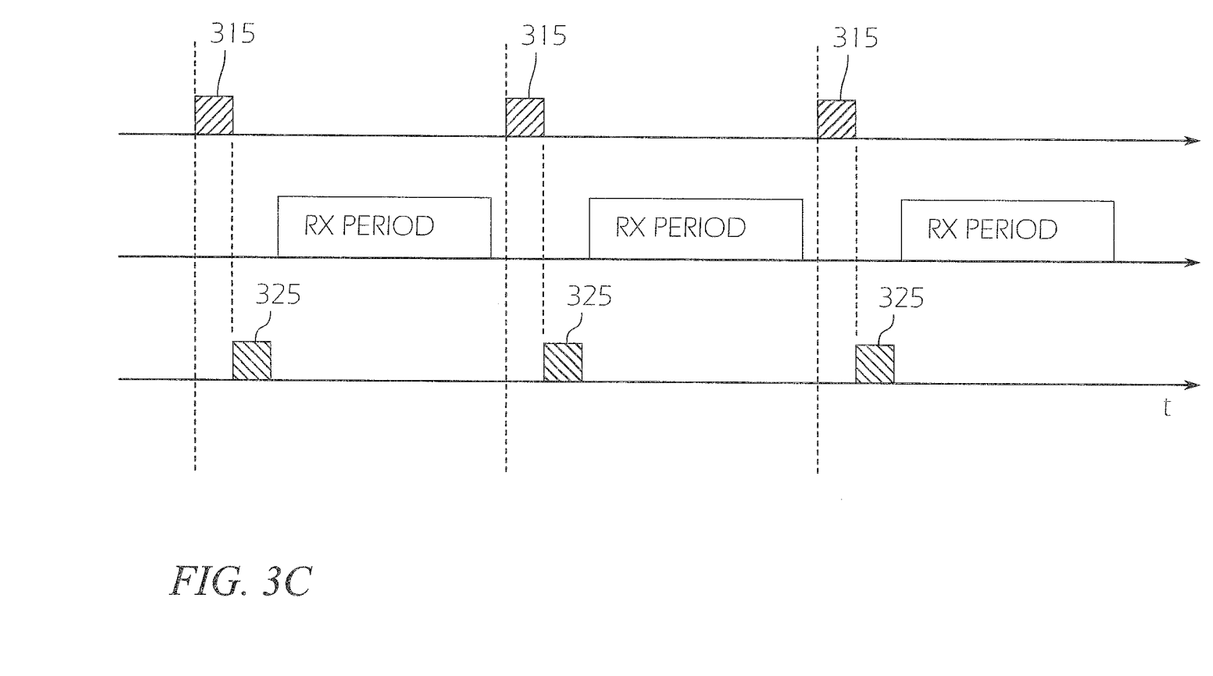
FIG. 3C is a timeline of pulse transmission and reception according to another embodiment of the present invention.

Several variants on the embodiments disclosed above may also be built. For example, in an embodiment with two transmitters, the transmitters need not transmit pulses alternately but may transmit pulses simultaneously, if a way of distinguishing returns corresponding to the pulses from the different transmitters is implemented in the receiver circuitry. Referring to FIG. 3B, one such way is to configure the a first transmitter to transmit pulses 315 of one carrier frequency, and to configure a second transmitter to transmit pulses 325 of slightly different carrier frequency, and to configure the receiver circuitry with filters to separate the returns from the first transmitter, from the returns from the second transmitter. The frequency difference may be somewhat greater than the maximum Doppler frequency shift of the returns, to avoid ambiguity. More than two transmitters may also be configured to transmit simultaneously, or one immediately after the other, by using more than two frequencies, and separating the returns in the receiver circuitry. The filters used to separate the returns corresponding to the different transmitters may, for example, be connected to the outputs of LNAs, in the LNA block 140 (FIG. 1), each of which may be connected to a receiving antenna element. If the transmitters operate one immediately after another, as shown in FIG. 3C, then a single transmitter drive circuit may be shared by multiple transmitters.

In another embodiment, other techniques may be used to distinguish, in the receiver circuitry, the returns corresponding to multiple pulses transmitted simultaneously by multiple transmitters. These techniques include phase or frequency coding, or pulse coding within the transmitted pulses, and the use of corresponding matched filters at the outputs of LNAs amplifying the signals received, respectively, by the receiving antenna elements. In these and other embodiments, an existing HFSWR installation may be retrofitted for, or a new one may be built with, improved performance at relatively low cost, because changes needed in the receiver circuitry, and the cost of adding one or more transmitters, are slight in view of the performance improvements that may be achieved. In a new installation, the cost for achieving required performance may be reduced, because the need for fewer receivers and for less space for the receiving antenna array may result in cost savings outweighing the cost of one or more additional transmitters.

Although limited embodiments of a virtual antenna extension for sampled aperture arrays have been specifically described and illustrated herein, many modifications and variations will be apparent to those skilled in the art. Accordingly, it is to be understood that a virtual antenna extension for a sampled aperture array employed according to principles of this invention may be embodied other than as specifically described herein. The invention is also defined in the following claims, and equivalents thereof.

What is claimed is:

1. A high frequency surface wave radar system, comprising:
   a physical receiving antenna array comprising m stationary receiving antenna elements, m being a positive integer;
   receiver circuitry coupled to the receiving antenna elements;
   a first stationary transmitter; and
   a second stationary transmitter,
   the system being configured to:
      transmit, from the first stationary transmitter, a first transmitted pulse,
      receive, by each of the receiving antenna elements, a respective first radar return corresponding to the first transmitted pulse,
      transmit, from the second stationary transmitter, a second transmitted pulse,
      receive, by each of the receiving antenna elements, a respective second radar return corresponding to the second transmitted pulse, and
      concatenate:
         a first numerical array consisting of m first time series, each first time series consisting of samples of the first radar return received by a corresponding antenna element; and
         a second numerical array consisting of m second time series, each second time series consisting of samples of the second radar return received by a corresponding antenna element,
   to form a third numerical array consisting of 2m time series, the third numerical array being identical to a numerical array that would be formed by a physical receiving antenna comprising 2m elements receiving radar returns corresponding to a single pulse transmitted by a single stationary transmitter.

2. The system of claim 1, wherein:
   the first stationary transmitter is configured to transmit a first sequence of radar pulses separated from each other by at least twice a round-trip travel time corresponding to a maximum target range; and
   the second stationary transmitter is configured to transmit a second sequence of radar pulses separated from each other by at least twice the round-trip travel time corresponding to the maximum target range, each pulse in the second sequence of radar pulses being separated from each pulse in the first sequence of radar pulses by at least the round-trip travel time corresponding to the maximum target range.

3. The system of claim 2, wherein the receiver circuitry is configured to distinguish first radar returns, corresponding to radar pulses in the first sequence of radar pulses, from second radar returns, corresponding to radar pulses in the second sequence of radar pulses, by:
   identifying a radar return received after the transmission of a pulse in the first sequence of pulses and before the following pulse in the second sequence of pulses as a first radar return; and
   identifying a radar return received after the transmission of a pulse in the second sequence of pulses and before the following pulse in the first sequence of pulses as a second radar return.

4. The system of claim 2, wherein the first stationary transmitter and the second stationary transmitter are configured to transmit pulses simultaneously.

5. The system of claim 4, wherein:
   pulses in the first sequence of pulses have a first carrier frequency;
   pulses in the second sequence of radar pulses have a second carrier frequency; and
   the second carrier frequency differs from the first carrier frequency.

6. The system of claim 5, wherein the second carrier frequency differs from the first carrier frequency by more than 0.00001 percent of the first carrier frequency.

7. The system of claim 5, wherein the receiver circuitry comprises a filter to distinguish the first radar returns from the second radar returns.

8. The system of claim 4, wherein the first stationary transmitter and the second stationary transmitter are configured to transmit pulses comprising phase coding.

9. The system of claim 8, wherein the receiver circuitry is configured to distinguish first radar returns, corresponding to radar pulses in the first sequence of radar pulses, from second radar returns, corresponding to radar pulses in the second sequence of radar pulses, by their phase coding.

10. The system of claim 2, further comprising one or more additional transmitters, each of the additional transmitters configured to transmit a sequence of radar pulses separated from each other by at least the round-trip travel time corresponding to the maximum target range.

11. The system of claim 10, wherein the receiver circuitry is further configured to:
distinguish the first radar returns, the second radar returns, and the radar returns corresponding to pulses transmitted by each of the additional transmitters from each other; and
concatenate the first radar returns, the second radar returns and the radar returns corresponding to pulses transmitted by each of the additional transmitters, to form a virtual receiving antenna array having a width greater than the width of the physical receiving antenna array.

12. The system of claim 1, wherein the receiving antenna elements are uniformly spaced.

13. The system of claim 1, wherein the physical receiving antenna array comprises 8 receiving antenna elements.

14. The system of claim 1, wherein the first stationary transmitter comprises a first transmitter drive circuit and a first transmitting antenna and the second stationary transmitter comprises the first transmitter drive circuit and a second transmitting antenna.

15. The system of claim 1, comprising a first transmitter drive circuit, a first transmitting antenna, a second transmitting antenna, and a switch, wherein in a first position the switch connects the first transmitter drive circuit to the first transmitting antenna, and in a second position the switch connects the first transmitter drive circuit to the second transmitting antenna.

16. A method for operating a high frequency surface wave radar system, the method comprising:
transmitting, from a first stationary transmitter in a first transmitting location, a first transmitted pulse;
receiving, by each of m stationary receiving antenna elements of a physical receiving antenna array, m being a positive integer, a respective first radar return corresponding to the first transmitted pulse;
transmitting, from a second stationary transmitter in a second transmitting location, a second transmitted pulse;
receiving, by each of the m stationary receiving antenna elements, a respective second radar return corresponding to the second transmitted pulse; and
concatenating:
a first numerical array consisting of m first time series, each first time series consisting of samples of the first radar return received by a corresponding antenna element; and
a second numerical array consisting of m second time series, each second time series consisting of samples of the second radar return received by a corresponding antenna element,
to form a third numerical array consisting of 2m time series, the third numerical array being identical to a numerical array that would be formed by a physical receiving antenna comprising 2m elements receiving radar returns corresponding to a single pulse transmitted by a single stationary transmitter.

17. The method of claim 16, wherein:
the first transmitted pulse is one of a sequence of first radar pulses separated from each other by at least twice a round-trip travel time corresponding to a maximum target range; and
the second transmitted pulse is one of a sequence of second radar pulses separated from each other by at least twice the round-trip travel time corresponding to the maximum target range, each pulse in the second sequence of radar pulses being separated from each pulse in the first sequence of radar pulses by at least the round-trip travel time corresponding to the maximum target range.

18. The method of claim 16, wherein the second pulse is transmitted simultaneously with the transmitting of the first pulse.

19. The method of claim 18, wherein the transmitting of the second pulse comprises transmitting the second pulse at a frequency different from a frequency of the first transmitted pulse.

20. A high frequency surface wave radar system, comprising:
a physical receiving antenna array comprising m stationary receiving antenna elements, m being a positive integer;
receiver circuitry coupled to the receiving antenna elements;
a first stationary transmitter having a first transmitting antenna; and
a second stationary transmitter having a second transmitting antenna,
the system being configured to:
transmit, from the first stationary transmitter, a first transmitted pulse,
receive, by each of the receiving antenna elements, a respective first radar return corresponding to the first transmitted pulse,
transmit, from the second stationary transmitter, a second transmitted pulse,
receive, by each of the receiving antenna elements, a respective second radar return corresponding to the second transmitted pulse, and
concatenate the first radar returns and the second radar returns to form a numerical array of time series identical to a numerical array of time series that would be formed by a physical receiving antenna comprising 2m elements receiving radar returns corresponding to a single pulse transmitted by a single stationary transmitter,
wherein:
the receiving antenna elements are uniformly spaced, each pair of adjacent receiving antenna elements being separated by a distance d, and
a separation between the first transmitting antenna and the second transmitting antenna is md.

* * * * *